Patented Sept. 7, 1926.

1,598,969

UNITED STATES PATENT OFFICE.

JOHN W. JONES, OF TRINIDAD, COLORADO.

HAIR TONIC.

No Drawing.  Application filed April 25, 1924.  Serial No. 709,048.

The present invention relates to a hair tonic and has for its object to provide a tonic of this nature which is efficient in treating the scalp and promoting the growth of hair.

To make the tonic first place cockle-bur or *Xanthium spinosum* in a suitable vessel and cover the same with water. This mixture is boiled until one fourth of the quantity remains thus forming a tea. One gallon of this cockle-bur tea is mixed with one gill of alcohol and sixty drops of bergamot or other perfume. The mixture is then thoroughly filtered and is ready for use.

The proportions which I have mentioned above have been found by experience to be those which are most efficient; of course, changes may be made in the proportions without destroying the efficacy of the tonic.

Having thus described my invention, what I claim as new is:

1. A hair tonic including cockle-bur, *Xanthium spinosum* tea and alcohol.

2. A hair tonic including cockle-bur, *Xanthium spinosum* tea and alcohol, in approximately the proportions of one gallon of cockle-bur tea and one gill of alcohol.

3. A hair tonic containing cockle-bur, *Xanthium spinosum* tea.

In testimony whereof I affix my signature.

JOHN W. JONES.